United States Patent
Tolksdorf

(10) Patent No.: US 9,825,568 B2
(45) Date of Patent: *Nov. 21, 2017

(54) DRIVE SYSTEM

(71) Applicant: Lenze Drives GmbH, Extertal (DE)

(72) Inventor: Andreas Tolksdorf, Hameln (DE)

(73) Assignee: Lenze Drives GmbH, Extertal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/889,627

(22) PCT Filed: May 8, 2014

(86) PCT No.: PCT/EP2014/059475
§ 371 (c)(1),
(2) Date: Feb. 17, 2016

(87) PCT Pub. No.: WO2014/180960
PCT Pub. Date: Nov. 13, 2014

(65) Prior Publication Data
US 2016/0181958 A1   Jun. 23, 2016

(30) Foreign Application Priority Data

May 8, 2013 (DE) .................. 10 2013 208 552

(51) Int. Cl.
*H02P 7/00* (2016.01)
*H02P 9/00* (2006.01)
*H02P 9/42* (2006.01)

(52) U.S. Cl.
CPC ............. *H02P 9/007* (2013.01); *H02P 9/42* (2013.01)

(58) Field of Classification Search
CPC ...... H02P 6/005; H02P 9/007; H02P 2207/07; H02P 2207/076
(Continued)

(56) References Cited

U.S. PATENT DOCUMENTS 3,810,253 A   5/1974   Vergara et al.
4,625,160 A   11/1986  Hucker
(Continued)

FOREIGN PATENT DOCUMENTS

CN   201226504 Y   4/2009
CN   101924437 A   12/2010
(Continued)

OTHER PUBLICATIONS

International Search Report (PCT/ISA/210) issued in PCT Application No. PCT/EP2014/059475 dated Dec. 9, 2014 with English translation (seven pages).
(Continued)

*Primary Examiner* — Bickey Dhakal
(74) *Attorney, Agent, or Firm* — Crowell & Moring LLP

(57) ABSTRACT

A drive system has: a three-phase motor, having: a shaft, a first three-phase winding set, having: a three-phase stator winding for connection to a three-phase alternating voltage network and a three-phase rotor winding, which is coupled to the shaft in a mechanical, rotationally fixed manner, a second three-phase winding set, having: a three-phase stator winding for connection to the three-phase alternating voltage network in such a manner that rotary field is produced that runs in the opposite direction to a rotary field that is produced by the stator winding of the first winding set.

2 Claims, 2 Drawing Sheets

(58) Field of Classification Search
USPC .......................................................... 318/140
See application file for complete search history.

(56) References Cited

U.S. PATENT DOCUMENTS

| | | | |
|---|---|---|---|
| 4,806,841 | A | 2/1989 | Lee et al. |
| 5,798,631 | A | 8/1998 | Spee et al. |
| 6,278,211 | B1 | 8/2001 | Sweo |
| 7,095,128 | B2 * | 8/2006 | Canini ................ F03D 9/002 290/44 |
| 8,508,179 | B2 | 8/2013 | Schmidt et al. |
| 9,641,034 | B2 | 5/2017 | Ito et al. |
| 2006/0006755 | A1 * | 1/2006 | Leijon ..................... H02J 3/34 310/184 |
| 2008/0150285 | A1 * | 6/2008 | Corcelles Pereira . H02J 3/1807 290/44 |
| 2015/0305197 | A1 * | 10/2015 | King ..................... H05K 7/207 361/695 |

FOREIGN PATENT DOCUMENTS

| | | |
|---|---|---|
| DE | 2 320 023 A1 | 5/1974 |
| DE | 102 59 068 A1 | 7/2004 |
| DE | 600 19 730 T2 | 9/2005 |
| EP | 2 297 843 B1 | 8/2012 |
| JP | 2009077611 A * | 4/2009 |
| JP | 2014-87141 A | 5/2014 |
| WO | WO 00/67355 A1 | 11/2000 |

OTHER PUBLICATIONS

Malik et al. "Brushless Doubly-fed Induction Machine with Rotating Power Electronic Converter for Wind Power Applications" International Conference on Electrical Machines and Systems, Aug. 20, 2011, six pages, Department of Electrical Machines and Power Electronics et al., Stockholm, Sweden, XP032020184.

Malik et al. "Dynamic Modeling and Control of a Brushless Doubly-Fed Induction Generator with a Rotating Power Electronic Converter" International Conference on Electrical Machines, Sep. 2, 2012, pp. 900-906, XP032464824.

* cited by examiner

DRIVE SYSTEM

BACKGROUND AND SUMMARY OF THE INVENTION

The invention relates to a drive system based on a double-fed asynchronous motor.

In what is called a power converter cascade of a double-fed asynchronous motor, rotor currents or rotor outputs that occur are usually conducted away by way of slip rings. However, slip rings are susceptible to failure and require maintenance.

The invention is based on the task of making available a drive system based on a double-fed asynchronous motor, which system does not require any slip rings and has improved operating properties as compared with conventional double-fed asynchronous motors.

The invention accomplishes this task by means of a drive system comprising: a three-phase motor, having a shaft, a first three-phase winding set, having: a three-phase stator winding, which is to be connected with a three-phase alternating voltage network, and a three-phase rotor winding, which is mechanically coupled with the shaft, in rotationally fixed manner, and a second three-phase winding set, having: a three-phase stator winding, which is to be connected with the three-phase alternating voltage network in such a manner that as compared with a rotary field that is produced by means of the stator winding of the first winding set, a rotary field that runs in the opposite direction is produced, and a three-phase rotor winding that is coupled to the shaft in mechanical, rotationally fixed manner, a first inverter, which is mechanically coupled with the shaft in rotationally fixed manner, and is electrically coupled with the three-phase rotor winding of the first winding set, and a second inverter, which is mechanically coupled with the shaft in rotationally fixed manner, and electrically coupled with the three-phase rotor winding of the second winding set, wherein the first inverter and the second inverter are electrically coupled in such a manner that electrical power can be transmitted between the inverters, wherein the second inverter is configured for generating triggering signals for its related rotor winding, in such a manner that a resulting motor speed of rotation generated by means of the second inverter corresponds to a motor speed of rotation generated by means of the first inverter, wherein the first and the second inverter are configured for generating triggering signals for their related rotor windings, in such a manner that a direction of effect of a torque generated by the first inverter corresponds to a direction of effect of a torque generated by the second inverter.

The drive system has a three-phase motor, a first inverter, and a second inverter.

The three-phase motor conventionally has a shaft that is driven by the motor.

The three-phase motor furthermore has a first three-phase winding set. The first three-phase winding set has a three-phase stator winding, which conventionally is to be connected directly, particularly without the interposition of an inverter, with a three-phase alternating voltage network to produce a magnetic rotary field. The first three-phase winding set furthermore has a three-phase rotor winding or rotor winding that is coupled to the shaft in mechanical, rotationally fixed manner.

The three-phase motor furthermore has a second three-phase winding set. The second three-phase winding set has a three-phase stator winding, which is to be connected with the three-phase alternating voltage network in such a manner that as compared with the magnetic rotary field that is produced by means of the stator winding of the first winding set, a magnetic rotary field that runs in the opposite direction is produced. The second three-phase winding set furthermore has a three-phase rotor winding that is coupled to the shaft in mechanical, rotationally fixed manner.

The first inverter is mechanically coupled with the shaft in rotationally fixed manner, i.e. it rotates with the shaft, and is electrically coupled with the three-phase rotor winding of the first winding set. The first inverter generates triggering signals in the form of triggering voltages and/or triggering currents having suitable amplitude and phasing.

The second inverter is mechanically coupled with the shaft in rotationally fixed manner, and electrically coupled with the three-phase rotor winding of the second winding set.

The first inverter and the second inverter can be electrically coupled in such a manner that electrical power can be bidirectionally transmitted between the inverters. For this purpose, the first and the second inverter can have an intermediate circuit coupling, for example.

The second inverter can be configured for generating triggering signals for its related rotor winding in such a manner that a resulting motor speed of rotation generated by means of the second inverter precisely corresponds to a motor speed of rotation generated by means of the first inverter.

The first and the second inverter can be configured for generating triggering signals for their related rotor windings in such a manner that a sum of an effective output fed into its related rotor winding by the first inverter and of an effective output fed into its related rotor winding by the second inverter amounts to zero.

The first and the second inverter can be configured for generating triggering signals for their related rotor windings in such a manner that a direction of effect of a torque generated by the first inverter corresponds to a direction of effect of a torque generated by the second inverter.

The drive system can have a fan wheel driven by means of the shaft, wherein the first and the second inverter are coupled with the fan wheel in rotationally fixed manner and thermally coupled with it. The first and the second inverter can be attached at any desired position, for example in the region of the point of rotation of the fan wheel or outside of the point of rotation, on the side or on top of the fan wheel.

The first and the second inverter can be integrated into the fan wheel, for example in that the fan wheel forms a housing for the first and the second inverter.

BRIEF DESCRIPTION OF THE DRAWINGS

The invention will be described in detail below, making reference to the drawings. These schematically show.

DETAILED DESCRIPTION OF THE DRAWINGS

Figure 1:
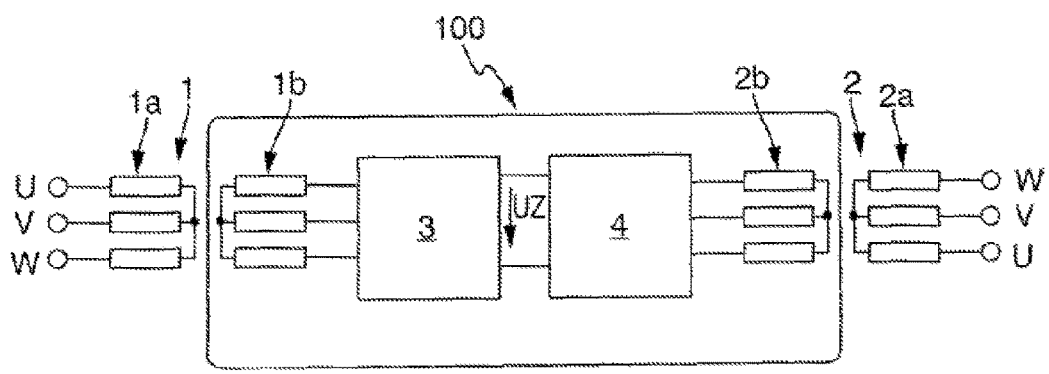
FIG. 1 a drive system according to the invention, having a first and a second drive system section, FIG. 2 complementary working points of the drive system sections shown in FIG. 1, and FIG. 3 direction of effect of rotor outputs in the operational quadrants of the drive system shown in FIG. 1.

FIG. 1 shows a drive system 100 according to the invention, having a three-phase motor, a first inverter 3, and a second inverter 4.

The three-phase motor conventionally has a shaft, not shown.

The three-phase motor furthermore has a first three-phase winding set 1. The first three-phase winding set 1 has a three-phase stator winding 1a that is conventionally connected directly, without the interposition of an inverter, with a three-phase alternating voltage network, here, as an example, the three network phases U, V, and W, to produce a magnetic rotary field. The first three-phase winding set 1 furthermore has a three-phase rotor winding 1b that is coupled to the shaft in mechanical, rotationally fixed manner.

The three-phase motor furthermore has a second three-phase winding set 2. The second three-phase winding set 2 has a three-phase stator winding 2a, which is connected with the three-phase alternating voltage network, here, as an example, the three network phases, in the reverse order W, V, and U, so that as compared with the rotary field that is produced by means of the stator winding 1a of the first winding set 1, a rotary field that runs in the opposite direction occurs. The second three-phase winding set 2 furthermore has a three-phase rotor winding 2b that is coupled to the shaft in mechanical, rotationally fixed manner.

In order to bring about the result that the rotary fields produced by means of the stator windings 1a and 2a run in opposite directions, the winding sets 1 and 2 can be wound in opposite directions, for example. As shown in FIG. 1, alternatively, the stator voltages U, V, and W can be connected with the stator windings 1a and 1b in opposite directions.

The first inverter 3 is mechanically coupled with the shaft in rotationally fixed manner, and electrically coupled with the three-phase rotor winding 1b of the first winding set 1. The first inverter 3 generates triggering signals in the form of triggering voltages and/or triggering currents having suitable amplitude and phasing.

The second inverter 4 is mechanically coupled with the shaft in rotationally fixed manner, and electrically coupled with the three-phase rotor winding 2b of the second winding set. The first inverter 3 and the second inverter 4 have an intermediate circuit coupling (intermediate circuit voltage UZ), so that electrical power can be bidirectionally transmitted between the inverters 3 and 4.

The second inverter 4 is configured for generating triggering signals for its related rotor winding 2b, in such a manner that a resulting motor speed of rotation generated by means of the second inverter 4 corresponds to a motor speed of rotation generated by means of the first inverter 3.

The first and the second inverter 3 and 4 are configured for generating triggering signals for their related rotor windings 1b and 2b, respectively, in such a manner that a sum of an effective output fed into its related rotor winding 1b by the first inverter 3 and of an effective output fed into its related rotor winding 2b by the second inverter 4 amounts to zero.

The first and the second inverter 3 and 4 are configured for generating triggering signals for their related rotor windings 1b and 2b, respectively, in such a manner that a direction of effect of a torque generated by the first inverter 3 corresponds to a direction of effect of a torque generated by the second inverter 4.

According to the invention, inverters (or frequency converters) 3 and 4 of a double-fed asynchronous motor disposed on the rotor side and running along with the (motor) shaft are controlled using double winding sets 1 and 2, in such a manner that the rotor output of the first winding set 1 that occurs in asynchronous motors is just compensated by the rotor output of the second winding set 2, and the rotor output of the second winding set 2 makes a torque contribution that acts in the same direction as the torque generated by the first winding set 1. In this way, it is possible to operate the three-phase motor in all four operational quadrants, without restriction of the speed of rotation between the synchronous speed of rotation of the first drive system section and the synchronous speed of rotation of the second drive system section.

The two stator windings 1a and 2a are to be jointly applied to a three-phase network having the phase voltages U, V, and W, and generate essentially sine-shaped network currents in this network. Because of the four-quadrant capability of the drive system 100, no additional measures such as brake choppers or resistors or electronics for energy feedback during generator-type operation are subsequently required.

The invention is based on the principle of a power converter cascade in a double-fed asynchronous motor. The rotor currents and rotor outputs that occur are not conducted away by way of slip rings, however, but rather by a further inverter 4, which is affixed to the shaft so as to rotate with it.

The drive system 100 has two drive system sections (motor sections), namely a first drive system section (first motor section) comprising the first winding set 1 and the related first inverter 3, and a second drive system section (second motor section) comprising the second winding set 2 and the related second inverter 4.

In the second drive system section, in the same manner, the rotor output transmitted by way of the first drive system section is transmitted back into the supplying network.

According to the invention, a complementary working point is set in the second drive system section. In this regard, the working point of the second drive system section is determined by means of controlling the second inverter 4, in such a manner that a) the speeds of rotation of the two motor sections or drive system sections are precisely the same, and b) the sum of the two rotor outputs comes to zero.

For the power converter cascade, it is known that the relationship $$n_{motor} = f_{network} - f_{INV1}$$

holds true, wherein here, the number of pole pairs is assumed to be p=1, for the sake of simplicity, but the invention is not restricted to this. $n_{motor}$ represents a motor speed of rotation, $f_{network}$ represents the network frequency, and $f_{INV1}$ represents a frequency of a basic oscillation generated by the first inverter 3.

To fulfill condition a), the frequency of the second drive system section must be selected in such a manner that $$f_{INV2} = 2 * f_{network} - f_{INV1}$$

holds true. This frequency represents the complementary working point of the second drive system section for the working point of the first drive system section. $f_{INV2}$ represents a frequency of a basic oscillation generated by the second inverter 4.

Figure 2:
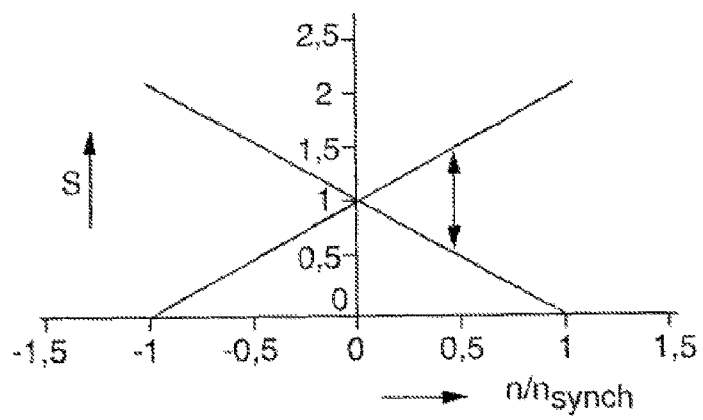

FIG. 2 shows the relationship between the required working frequencies of the two inverters 3 and 4, wherein n represents the speed of rotation, $n_{synch}$ represents the synchronous speed of rotation, and s represents the slip. An influence of the numbers of pole pairs, which can differ between the drive system sections, is not shown for the sake of simplicity.

From FIG. 2, it is evident that precisely two working points must be found for each speed of rotation n, one each for each drive system section.

Figure 3:
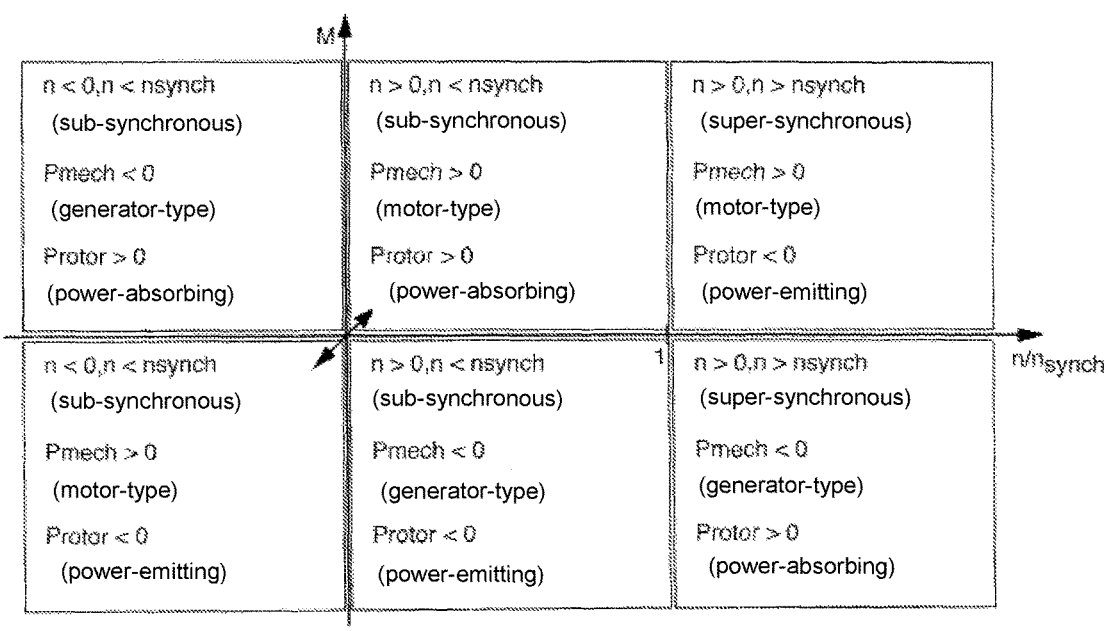

FIG. 3 illustrates that at these working points, the rotor outputs have opposite signs, in each instance, at the same direction of effect of the motor torque. This has its cause in that the first drive system section, for example, is operated in the $1^{st}$ quadrant, and the second drive system section is operated in the $3^{rd}$ quadrant.

In the case of generator-type operation, the operational points of the drive system sections lie in the $2^{nd}$ and $4^{th}$ quadrant. In generator-type operation, as well, the rotor outputs are complementary to one another.

From FIG. 3, it is evident that complementary operational points cannot be found above the synchronous speed of rotation. Speeds of rotation above the synchronous speed of rotation can be implemented, however, with torques in the second drive system section, which counter the desired useful torque. However, only small rotor outputs need to be processed in the complementary drive system section, in the vicinity of the synchronous speed of rotation.

The complementary operational points allow a setting range of the speed of rotation between the two synchronous speeds of rotation, including motor idling and thereby operation at constant load torques below the synchronous speed of rotation. According to the invention, use of the complementary or corresponding operational points can take place in the complete speed of rotation range between the synchronous speeds of rotation of the two system sections, at which torques that act in the same direction are present, by means of the inverters disposed on the rotor side.

The two stator rotary fields of the drive system sections turn in opposite directions. This then results in torques between the synchronous speeds of rotation, which torques are directed in the same direction.

Because the two drive system sections behave like a general transformer when the network voltage is turned on, on the stator side, at first an intermediate circuit capacitor present between the inverters 3 and 4 jointly is charged by way of free-running diodes (not shown) of the inverters 3 and 4 disposed on the rotor side. As long as the inverters 3 and 4 are not operated in cycled manner, the idle voltage of the rotor side occurs in the intermediate circuit. A rotational movement of the motor does not occur.

An auxiliary voltage supply of the inverters 3 and 4 can take place by way of tapping the intermediate circuit voltage UZ. The required output is covered by means of detuning the output balance of the rotor output. This is possible even at a synchronous speed of rotation of a drive system section, by means of the other drive system section, in each instance.

Preferably, what are called vector regulators are used as the respective operational or regulation methods of the inverters 3 and 4; these allow regulating the amplitudes and the phase angles of the rotor currents. The regulation technology methods for mastering a double-fed asynchronous machine are sufficiently known and can be used here, as well.

The intermediate circuit voltage UZ of the two inverters 3 and 4 can be used as a regulation variable, in order to achieve output equilibrium between the two drive system sections.

The speed of rotation n=0 does not represent an unusual operational state for the drive system 100 according to the invention. Because the rotor currents to be regulated turn in the two drive system sections at network frequency, the difficulties that are otherwise present in asynchronous motors, when mastering motor idling with torque, do not occur in the present case. A soft transition occurs between motor-type operation and generator-type operation. This has particular significance for lift drives, for example.

In idling, the rotor output of a drive system section has a level that corresponds to the shaft output at the synchronous speed of rotation at the same torque. This rotor output leads to a torque at the same level in the second drive system section, if losses present in the system during idling are ignored. From this, it follows that during startup, each drive system section makes half the contribution to the required torque. This property makes it possible to use the drive system according to the invention for all applications in which high startup torques and also cyclical startup torques are required, and in which the torque requirement decreases with an increasing speed of rotation, such as in many conveying technology applications, for example.

The frequency of the rotor currents is retained in both drive system sections. Under load, only the amplitude and the angle of the rotor currents change, but the frequency does not. With this drive, gap-free change-over through all four operational quadrants is possible.

Changes in the network frequency lead to changes in the speed of rotation. For the complementary working point, however, the frequency of the second inverter 4 must be adjusted with a double stroke in the event of a change in the network frequency, in order to adhere to the conditional equation (see above) for the complementary working point. Because the level of the frequency adjustment is known from this, the working point of the first inverter 3 can also be updated. The system then behaves in fixed-speed manner.

It is understood that the drive system 100 according to the invention is not restricted to a pole pair number p=1. Fundamentally, the equations indicated here can also be stated for other pole pair numbers. However, this was not done for reasons of simplicity.

If the pole pair numbers of the two drive system sections are the same, symmetrical operational points occur, independent of the direction of rotation of the inverter frequencies and the phase sequence of the network voltage. The complementary working points are symmetrical to one another, as shown in FIG. 2. If the pole pair numbers of the drive system sections are different, the inclines of the straight lines in FIG. 2 change, and this leads to an adaptation of the equation for determining the complementary working points.

Fundamentally, the topology of the inverters 3 and 4 is not restricted to intermediate circuit voltage inverters. Fundamentally, I-inverters and direct-acting inverters can also be used.

Fundamentally, dimensioning of the drive system sections is not restricted to these being structured symmetrically. A symmetrical design leads to the result that no preferential direction of rotation of the drive system is present, and all four quadrants can be used equivalently. No dependence on the phase sequence of the network voltage exists. A symmetrical design of the two drive system sections can particularly lead to a significant reduction in the required construction sizes of the components involved, particularly in applications having a preferential direction of rotation and linear or square torque progressions.

By means of the invention, an asynchronous machine can be operated as a drive having a variable speed of rotation, on a rigid network, in all four operational quadrants. Furthermore, feedback-free operation with great precision of the speed of rotation is possible. Low speeds of rotation, all the way to idling, as well as a switch to generator-type operation can be managed. Only sine-shaped network currents occur, based on the system, and thereby the network load is significantly reduced.

Operation free of reactive power is possible in the network, because the reactive power of the motor can be conducted by way of the rotor-side inverters. In this way, the network load can be further reduced.

As compared with conventional systems, the inverters can be dimensioned for smaller outputs, because only the rotor output must be conducted into the inverters.

Cost-advantageous and low-loss power components having a low rated voltage can be dimensioned, as compared with conventional systems, because the rotor voltage can be determined by way of the ratio of the number of windings of the rotor/stator windings.

The EMC effort can be reduced, because switching takes place on the rotor side of the inverter.

The invention claimed is:

1. A drive system, comprising:
a three-phase motor, having
a shaft,
a first three-phase winding set, having:
a three-phase stator winding, which is to be connected with a three-phase alternating voltage network, and
a three-phase rotor winding, which is mechanically coupled with the shaft, in rotationally fixed manner, and
a second three-phase winding set, having:
a three-phase stator winding, which is to be connected with the three-phase alternating voltage network in such a manner that as compared with a rotary field that is produced by way of the stator winding of the first winding set, a rotary field that runs in the opposite direction is produced, and
a three-phase rotor winding that is coupled to the shaft in mechanical, rotationally fixed manner,
a first inverter, which is mechanically coupled with the shaft in rotationally fixed manner, and is electrically coupled with the three-phase rotor winding of the first winding set, and
a second inverter, which is mechanically coupled with the shaft in rotationally fixed manner, and electrically coupled with the three-phase rotor winding of the second winding set,
wherein the first inverter and the second inverter are electrically coupled in such a manner that electrical power can be transmitted between the inverters,
wherein the second inverter is configured for generating triggering signals for its related rotor winding, in such a manner that a resulting motor speed of rotation generated by way of the second inverter corresponds to a motor speed of rotation generated by way of the first inverter,
wherein the first and the second inverter are configured for generating triggering signals for their related rotor windings, in such a manner that a direction of effect of a torque generated by the first inverter corresponds to a direction of effect of a torque generated by the second inverter,
wherein the three-phase alternating voltage network has a frequency ($f_{network}$), and
wherein the first and the second inverter are configured for generating the triggering signals for their related rotor windings in such a manner that the first inverter generates a basic oscillation having a frequency ($f_{INV1}$), and the second inverter generates a basic oscillation having a frequency ($f_{INV2}$), wherein for a number of pole pairs p=1 the following equation applies: $f_{INV2}=2*f_{network}-f_{INV1}$.

2. The drive system according to claim 1, wherein the first and the second inverter are configured for generating triggering signals for their related rotor windings, in such a manner that a sum of an output fed into its related rotor winding by the first inverter and of an output fed into its related rotor winding by the second inverter amounts to zero.

* * * * *